Oct. 4, 1932.  O. SANDVIK  1,880,496
PHOTOGRAPHIC FILM FOR SOUND AND PICTURE PURPOSES
Filed June 14, 1929    2 Sheets-Sheet 1
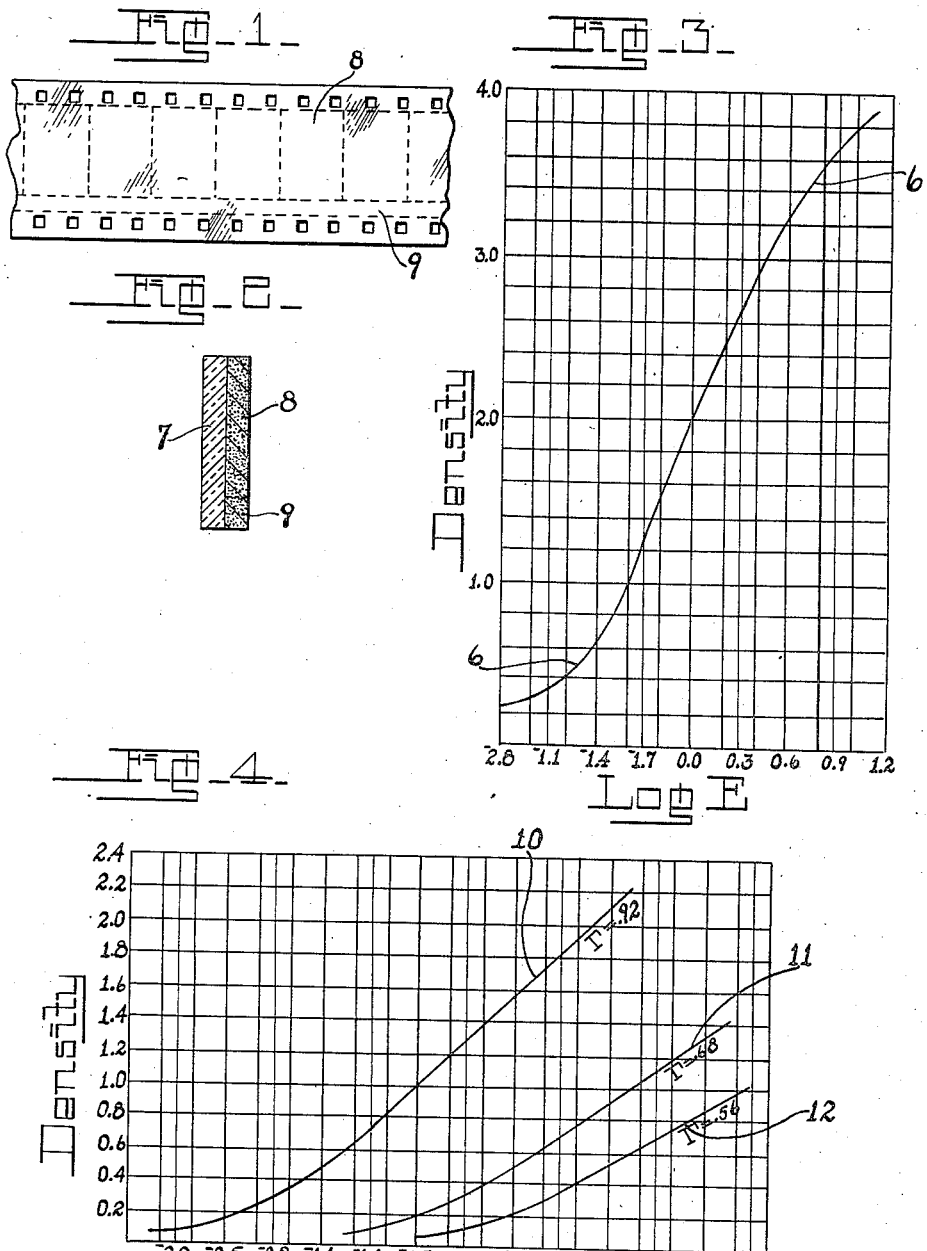
Inventor
Otto Sandvik
By N. M. Perrice
Attorney Oct. 4, 1932.　　　　O. SANDVIK　　　　1,880,496
PHOTOGRAPHIC FILM FOR SOUND AND PICTURE PURPOSES
Filed June 14, 1929　　2 Sheets-Sheet 2
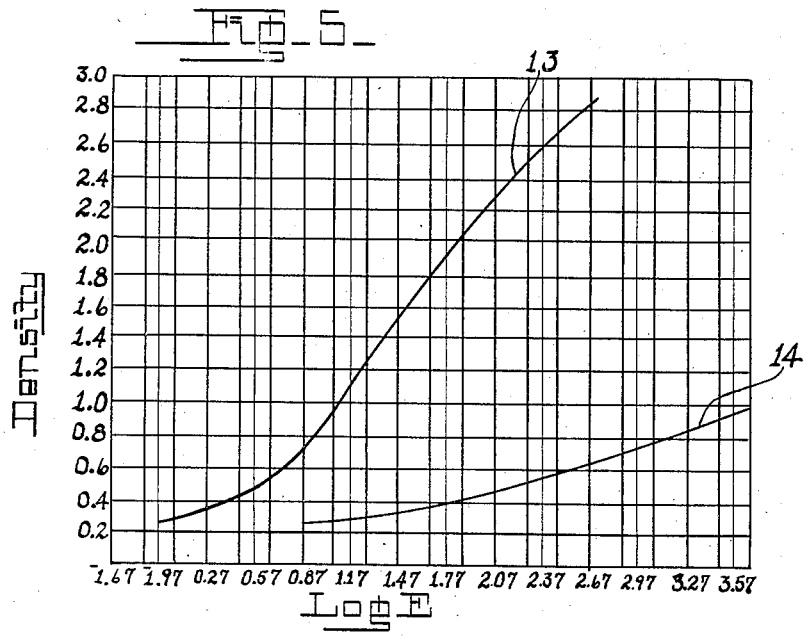
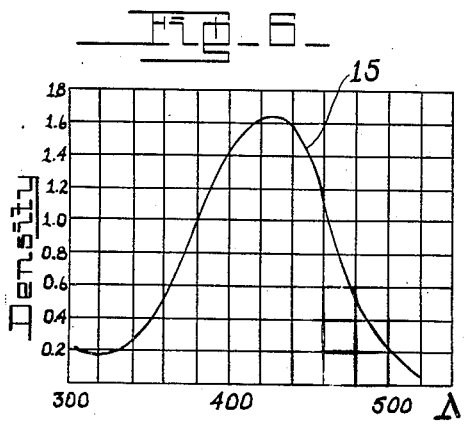
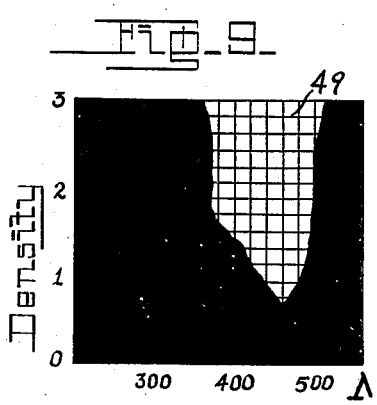
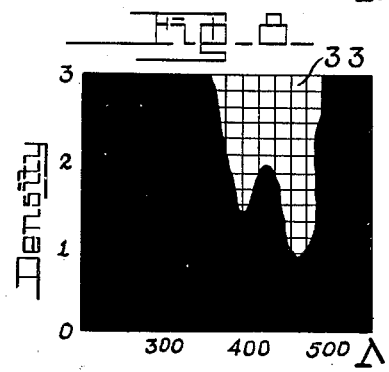
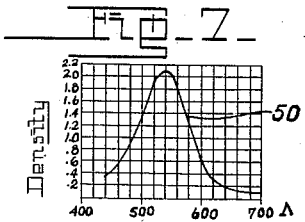
Inventor
Otto Sandvik
By N. M. Perviss
Attorney

Patented Oct. 4, 1932

1,880,496

UNITED STATES PATENT OFFICE

OTTO SANDVIK, OF ROCHESTER, NEW YORK, ASSIGNOR TO EASTMAN KODAK COMPANY, OF ROCHESTER, NEW YORK, A CORPORATION OF NEW YORK

PHOTOGRAPHIC FILM FOR SOUND AND PICTURE PURPOSES

Application filed June 14, 1929. Serial No. 370,952.

This invention relates to photographic film and more particularly to film for use in the photographic recording of pictures and sound.

Much difficulty has been encountered in the past in recording pictures and sound records on the same film since the sensitized layer which is suitable for recording pictures does not satisfy the requirements for the satisfactory recording of sound. This has resulted in a sacrifice of the quality of the pictures if the best sound effects were to be obtained or has resulted in poor sound reproduction if the best picture results were achieved. Furthermore with the present photographic materials there are certain conditions encountered in photographic sound recording which cannot be satisfied. These difficulties arise from the fact that the average transmission of the sound record should be high, preferably not less than thirty-five per cent while the product of contrast or more correctly the product of the gammas of the negative and positive must be a constant and preferably equal to unity.

In accordance with the present invention it is proposed to obtain a differential gamma control by incorporating in the sensitized emulsion of both the picture area and the sound track, different materials, which when printed under proper printing conditions, produce a differential gamma in the two areas. A further feature of the invention includes dyeing the picture areas with one dye and the sound area of a film with another dye and using proper light or filtered light for printing the two areas to obtain a differential gamma control. An additional feature of the invention includes the production of a sensitized material for the positive sound record which permits an average transmission of not less than 35% and still permits working the sensitized material on the straight line portion of its density-log exposure characteristic curve.

These and other features will be more clearly understood by reference to the drawings in which Fig. 1 is a plan view of a section of photographic film having picture areas and a sound record area thereon; Fig. 2 is a cross sectional view of this section of film; Figs. 3, 4 and 5 are curves useful in explaining the theory of the invention; Fig. 6 is a chart showing the spectral absorption of a yellow dye suitable for use in the yellow dyed portion of the film of this invention; Fig. 7 is a chart representing the spectral absorption of an orange dye suitable for use in the oranged dye portion of the film of this disclosure; while Figs. 8 and 9 are diagrams showing the characteristics of two suitable color filters.

It has been found that there are certain conditions in the practice of photographic sound recording which cannot be satisfied by photographic emulsions as now used, since first, the product of the slopes of the negative and positive characteristic curves must be a constant and preferably equal to unity, where the slope $=\dfrac{\text{density}}{\log \text{ exposure}}$ on any portion of the H and D characteristic curve, and second the average transmission of the positive sound print should be high, preferably not less than 35%. The first condition can be satisfied by working only on the straight line portion of the density-log exposure curves such as the characteristic curve 6 (Fig. 3) of both the negative and positive of present commercial film and developing the positive to a gamma with respect to the negative so that the product of their gammas would be unity. For example, if the gamma of the negative were 0.65 then since $\gamma_n \times \gamma_p = 1$, $\gamma_p 1.63$ where, $\gamma_n$, equals the gamma of the negative and, $\gamma_p$, equals the gamma of the positive. This, however, violates the second requirement of high average transmission because the straight line portion of the positive film begins at a density on this D-log E curve about 0.75 or a transmission of about 18% which is the maximum transmission and the average transmission, of course, would be much less than that and therefore much less than the desired 35%. Therefore, in the past it has been customary to work on the lower and curved portion of the positive D-log E curve with the accompanying difficulties of avoiding distortion.

A yellow dye suitable for use in the emulsion has the spectral absorption curve shown at 15 in Fig. 6 while an orange dye suitable for use in the emulsion has the spectral absorption curve 50 of Fig. 7.

In following the present invention the emulsion of the picture areas 8 has incorporated therein the mentioned yellow dye having the absorption curve 15 while the emulsion of the sound record area 9 has incorporated therein the orange dye represented by the absorption curve 50. A film having its picture areas and sound record area thus differentially dyed is then printed through a filter having characteristics indicated in Fig. 9 to effect the desired differentially gamma control. While the two different areas of the emulsion in Figs. 1 and 2 have been described as being dyed yellow and orange it will be understood that they may be dyed yellow and blue or yellow and green if printed by the proper source of light. Thus, when a combined picture and sound positive film are produced by printing from separate record films such as a picture negative and a sound negative, the same printing light may be used. In this way the gamma or degree of contrast of a picture record having the most pleasing reproduction is obtained which is usually achieved when the effective gamma product of the negative and of the positive is equal to 1.3 while the gamma of the sound record for correct sound reproduction is secured which results when the corresponding effective gamma product is a constant and preferably equal to unity. A single source of printing light can, therefore, be used which greatly simplifies the printing process.

It has been found that by the use of a proper dye in the emulsion and by utilizing suitable filters or printing light of the proper color, the density-log E curves can be altered so as to work on a portion of this curve in the positive which is entirely or very nearly a straight line, and yet have the necessary transmission. This will be understood from Figs. 4 and 5 in which curve 10 shows the resulting gamma of an ordinary, undyed positive printed through a blue filter having characteristics indicated in chart 49 of Fig. 9, while curves 11 and 12 represent the resulting gammas of positives respectively dyed yellow and orange when printed through a similar blue filter. In Fig. 5, curve 13 is a density-log E curve of ordinary film exposed to white light while curve 14 is a similar curve of dyed emulsion exposed to a colored light. While reference has been made to a blue filter having the characteristics represented at 49, other filters, for example, a green filter having the properties indicated at 33 in Fig. 8 may be used to give still a different gamma control.

Thus a film comprising the support 7 bearing properly dyed emulsions for the picture exposure areas 8 and the sound record area 9 is provided which will greatly improve the quality of pictures and sounds reproduced.

The present invention is an improvement over that disclosed in the application of John G. Capstaff S. No. 267,196, filed April 4, 1928, and patent of John G. Capstaff No. 1,690,617.

The color and intensity of the printing light for each of the images may be varied as may be necessary giving with the different dyes in the two parts of the emulsion a very complete and delicate control of the resulting images.

What I claim is:

1. The method of obtaining a differential gamma control between the sensitized picture exposure areas and the sound record area on the same photographic film which comprises dyeing the emulsion of the picture areas and the sound record area with dyes of different color absorption, and printing the picture areas and sound record area with light of the same color.

2. A photographic film comprising a support and a sensitized layer on said support constituting picture exposure areas and a sound record area, the picture exposure areas of said layer having gamma controlling material incorporated therein, and the sound record area of said layer having other gamma controlling material incorporated therein whereby the gammas of said areas may be differentially regulated.

3. A photographic film comprising a support and a sensitized layer on said support constituting picture exposure areas and a sound record area, the picture exposure areas of said layer having gamma controlling material incorporated therein, and the sound record area of said layer having other gamma controlling material in the form of a dye incorporated therein whereby the gamma of said areas may be differentially regulated.

4. A photographic film comprising a support and a sensitized layer on said support constituting picture exposure areas and a sound record area, said picture exposure areas of said layer having gamma controlling material in the form of a suitable yellow dye incorporated therein, and the sound record area of said layer having other gamma controlling material incorporated therein whereby the gammas of said areas may be differentially regulated.

5. The method of obtaining a differential control of the contrast of developed images in the sensitized picture record area and the sound record area of the same photographic film that comprises dyeing the emulsion of the two areas with dyes having different color absorption and light printing picture and sound records upon the respective areas by controlled light.

6. A photographic film band adapted for the reproduction of sound and motion pictures and comprising a support and a sensitized layer thereon constituting picture exposure areas and sound record areas, the said areas of the layer having dyes of different colors incorporated therein.

7. A sensitive photographic film band having in layer form sensitive areas constituting picture and sound record areas, the sensitive layer area constituting the picture area having dye of one color incorporated therein and the sensitive layer area constituting the sound area having dye of another color incorporated therein.

Signed at Rochester, New York this 9th day of June, 1929.

OTTO SANDVIK.